United States Patent [19]

O'Donnell et al.

[11] Patent Number: 5,951,697
[45] Date of Patent: Sep. 14, 1999

[54] TESTING THE SHARING OF STORED COMPUTER INFORMATION

[75] Inventors: Michael D. O'Donnell, Austin; Danny B. Gross, Bastrop; Gene R. Toomey, Kyle, all of Tex.

[73] Assignee: Advanced Micro Devices, Inc., Sunnyvale, Calif.

[21] Appl. No.: 08/866,729

[22] Filed: May 29, 1997

[51] Int. Cl.⁶ .................................................. G06F 11/00
[52] U.S. Cl. .............................. 714/37; 711/163; 709/220
[58] Field of Search ..................... 395/200, 600, 395/884; 714/37; 711/163; 709/220

[56] References Cited

U.S. PATENT DOCUMENTS

| | | | |
|---|---|---|---|
| 4,958,273 | 9/1990 | Anderson et al. | 364/200 |
| 5,155,847 | 10/1992 | Kirouac et al. | 395/600 |
| 5,321,816 | 6/1994 | Rogan et al. | 395/200 |
| 5,628,030 | 5/1997 | Tuckner | 395/884 |
| 5,796,999 | 8/1998 | Azagury et al. | 395/600 |

*Primary Examiner*—Joseph E. Palys
*Assistant Examiner*—Nguyen Xuan Nguyen
*Attorney, Agent, or Firm*—Skjerven, Morrill, MacPherson, Franklin & Friel LLP

[57] ABSTRACT

An apparatus for testing the sharing of stored information including a computer-readable storage medium and an information sharing protocol test harness module stored on the computer-readable storage medium. The information sharing protocol test harness module executes an information sharing protocol test case on a computer system responsive to a test initiation input. The information sharing protocol test case tests the locking of storage locations to prevent data corruption responsive to being executed.

37 Claims, 5 Drawing Sheets

TESTING THE SHARING OF STORED COMPUTER INFORMATION

CROSS-REFERENCE TO RELATED APPLICATIONS

This application relates to co-pending U.S. patent application Ser. No. 08/866,728, attorney docket number M-4631 US, filed on even date herewith, entitled "Multi-Client Test Harness", by Michael D. O'Donnell, Danny B. Gross and Gene R. Toomey, and which is incorporated herein by reference.

BACKGROUND

1. Field of the Invention

The present invention relates to computer system and software testing, and, more particularly, to testing information sharing protocol performance and compatibility in a computer system environment.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks and embedded systems. A typical computer system includes a processing unit, associated memory and control logic and a number of peripheral devices that provide input and output for the system. Such peripheral devices often include display monitor(s) or terminal devices, keyboards, mouse-type input devices, floppy and hard disk drives and printers. Computer systems may also include network capability, sound devices, electronic pen devices, voice recognition devices, and tape, CD-ROM (compact disk read only memory), CD-R (CD-recordable), DVD (digital versatile/video disk) or other drives.

Computer systems have attained widespread use in providing computer power to many businesses and institutions. Some important fields in which computer systems have become common include manufacturing monitoring and control; electrical, mechanical, and chemical system design and simulation; and network management and service. Productive processing time is of great importance to the users of computer systems in these and other fields because computer system down time can result in significant costs.

Computer systems are designed to provide a degree of system availability that is necessitated by the applications for which the computer system is intended. High availability (HA) computer systems, as their name implies, are required to be available, or "on," virtually all of the time. Such computer systems (or networks of such computer systems) should be substantially error free or should be capable of recovery from errors. Because computer systems having different hardware and software configurations are often required to interact in various applications, the computer systems should be tested for interactive compatibility prior to their implementation.

Computer systems are often tested using a series of programmable test cases. In one method of testing, the test cases model the input/output (I/O) of the computer system being tested, thereby testing the computer system's functionality and interaction with users and other computer systems. Test cases are often combined into sets of test cases called test suites that are executed by test scripts. Each test suite can exhaustively test an individual facet of a computer system. Multiple test suites can test entire computer systems.

Tools for multi-test execution support are called test harnesses. A test harness directs the execution of test suites and records data from the computer system that is generated as a result of the test cases executed. Test cases are typically run in sequence by the test harness and are easily repeatable when the test harness is used. The test suite may be repeated on a computer system after a specific test case is edited, after the computer system is altered, or after an error occurs with the computer system. Also, the test may be run on separate computer systems, and the results may then be compared to determine system compatibility. Test harnesses such as the International Business Machines (IBM) System Integration Test Bucket (SITB) and the Open Software Foundation (OSF) Test Environment Tool (TET) can perform regression and functional testing on a single system.

A common situation in computer system networks is the sharing of files or information by applications running on different computer systems. A similar situation is the sharing of files or information by multiple applications running on the same computer system. Thus, local and remote file sharing protocols are similar in function and purpose. File sharing protocols are often used to ensure that when one application accesses a storage location that is accessible by other applications, the other applications are prevented from corrupting the accessed information. In one such protocol, an entire file or portions of a file may be locked by a computer system application. Often, a file is locked by way of a locking remote procedure call (RPC) issued from a user application or client computer system to a server computer system which keeps a table of files that are locked by various client or server computer systems. Locking allows a file to be read or written atomically; that is, each read and/or write operation completes before the next begins.

An example of a locking procedure on a UNIX based computer system is the RPC lock daemon or lock manager (rpc.lockd). In a system that includes multiple computer systems capable of sharing files, an rpc.lockd program typically runs on a file server computer system and other rpc.lockd programs run, for example, on application computer systems. The rpc.lockd programs communicate with each other to ensure that reads and/or writes from one application computer system is coordinated with the reads and/or writes of other systems accessing the same data.

When multiple computer systems attempt to lock the same file or portions of the same file, problems can occur. Therefore, the information sharing and locking protocol of every computer system in a network of computer systems must be tested. If one computer system ignores the rules of the relevant information sharing protocol, data could be corrupted and entire networks of computer system can be adversely affected.

SUMMARY

It has been discovered that computer systems may be tested to ensure that shared information protocols are enforced on all computer systems. Shared information protocol testing provides the advantage that computer systems may be tested prior to deployment of the computer systems in a production environment that includes networked computer systems which share stored information. For example, a file locking test method provides the advantage that computer system file locking may be tested prior to implementation of the computer systems in various applications. Furthermore, shared information protocol testing provides the advantage that applications running on a computer system may be tested prior to use of the applications in a production environment that allows applications to share stored information.

In one embodiment of the present invention, an apparatus is provided for testing the sharing of stored information. The apparatus includes a computer-readable storage medium and an information sharing protocol test harness module stored on the computer-readable storage medium. The information sharing protocol test harness module executes an information sharing protocol test case on a computer system responsive to a test initiation input. The information sharing protocol test case tests the locking of storage locations to prevent data corruption responsive to being executed.

In another embodiment, a method of testing the sharing of stored information by a plurality of computer system applications is provided. The method includes requesting a first lock on a block of stored information by a first test application so that the first test application can access the block of stored information without the block of stored information being changed by a second test application. The method includes releasing the first lock on the block of stored information by the first test application. The method includes generating status information. The status information includes information regarding the requesting of the first lock and the releasing of the first lock on the block of stored information.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the preferred embodiments. The description is intended to be illustrative of the invention and should not be taken to be limiting. Many variations, modifications, additions, and improvements may fall within the scope of the invention as defined in the claims that follow.

In one embodiment of the invention, information sharing protocols of various computer system applications are tested by performing various file sharing test cases on each computer system having an application capable of accessing a shared data base or block of stored information. For example, each computer system is directed to request locks on files, alter locked files, and release locks on files at various times. A successful lock on a file or portion of a file grants the locking computer system or computer system application the sole privilege of modifying the file or the portion of the file locked. Although files as a whole are locked in some embodiments, it is understood that portions of files may be locked by other embodiments. Also, although locking may be conducted by different computer systems in some embodiments, it is understood that locking may be conducted by applications executing on the same computer system in other embodiments.

Figure 1:
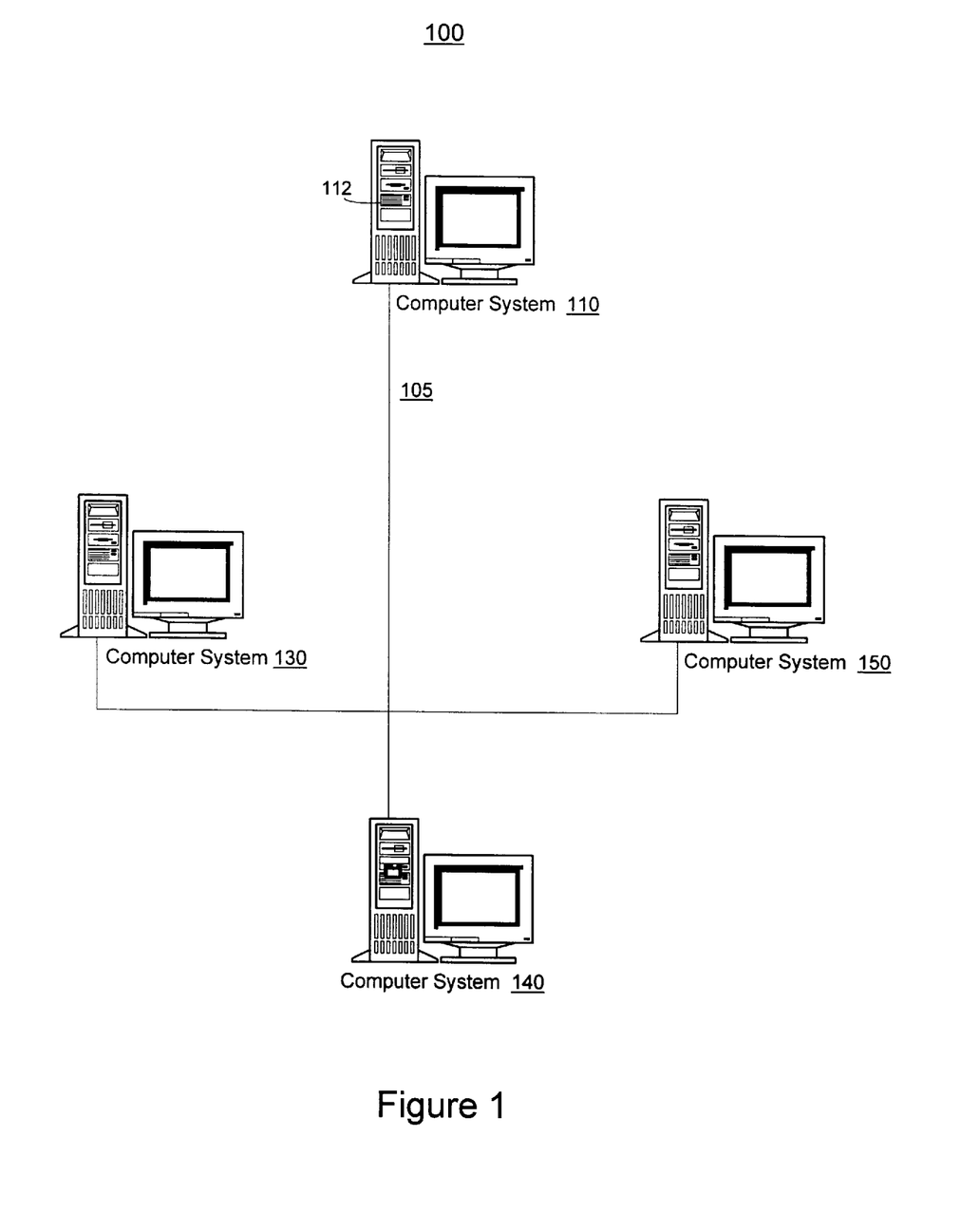
FIG. 1 shows a block diagram of an exemplary computer network according to an embodiment of the invention.

FIG. 1 depicts an exemplary computer network 100 in accordance with an embodiment of the invention. Computer network 100 includes various computer systems coupled within a distributed computing environment. For example, computer network 100 includes computer systems 110, 130, 140 and 150. Computer systems 110, 130, 140 and 150 are coupled together via Ethernet connection 105. In this exemplary embodiment, computer system 110 manages the file systems for computer network 100 and is referred to hereinafter as file server 110. Also, computer systems 130, 140 and 150 are application servers. File server 110 stores the data files, executable files and other files required by application servers 130, 140 and 150. File server 110 provides the files to the application servers 130, 140 and 150. Application servers 130, 140 and 150 access the files using the network file server (NFS) protocol. In one embodiment, application servers 130, 140 and 150 provide an interface for users to access the information stored on file server 110 to drive a manufacturing process such as a semiconductor manufacturing process.

In other embodiments, computer network 100 may include additional or fewer computer systems. For example, application servers 130, 140 and 150 may interact without file server 110, or there may be a different number of application servers. Also, the functionality of the various computer systems may differ from the computer systems of exemplary computer network 100. Network 100 may include additional computer systems of different types or combinations, or the functions of several of the servers may be combined into fewer servers or a single server. Furthermore, application servers 130, 140 and 150 may be of the same or different hardware type. For instance, each of application servers 130, 140 and 150 may be manufactured by a different computer system manufacturer. In this case, testing of information sharing protocols becomes important. Exemplary computer network 100 may be tested in accordance with the invention as long as stored information is shared (i.e., accessible by more than one computer system application). Also, each individual computer system may be tested in accordance with the invention if stored information is shared by different applications or computer processes, whether or not such applications or computer processes are running on the same or different computer systems.

In one embodiment, servers 110, 130, 140 and 150 operate under control of a UNIX type operating system. For example, some of servers 110, 130, 140 and 150 are Hewlett Packard Series 800 computer system running the HP-UX 9.04 type UNIX operating system. Such a computer system may function as a server for client computer systems. It is understood that other computer systems, other UNIX operating systems (e.g., the International Business Machines AIX operating system), and other operating systems may be used in accordance with the invention. Although servers are used in the embodiment of FIG. 1, other types of computer systems may be used in accordance with the invention. For example, other embodiments may include mainframes, minicomputers, workstations and/or personal computer systems.

Although file server 110 and application servers 130, 140 and 150 are coupled via Ethernet connection 105 in the embodiment of FIG. 1, any appropriate connection such as a fiber distributed data interface (FDDI) may be used in accordance with the invention. Also, although application servers 130, 140 and 150 access files on file server 110 using NFS protocol in the embodiment of FIG. 1, other appropriate methods of making the files available to application servers 130, 140 and 150 may be used in accordance with the invention.

Figure 2:
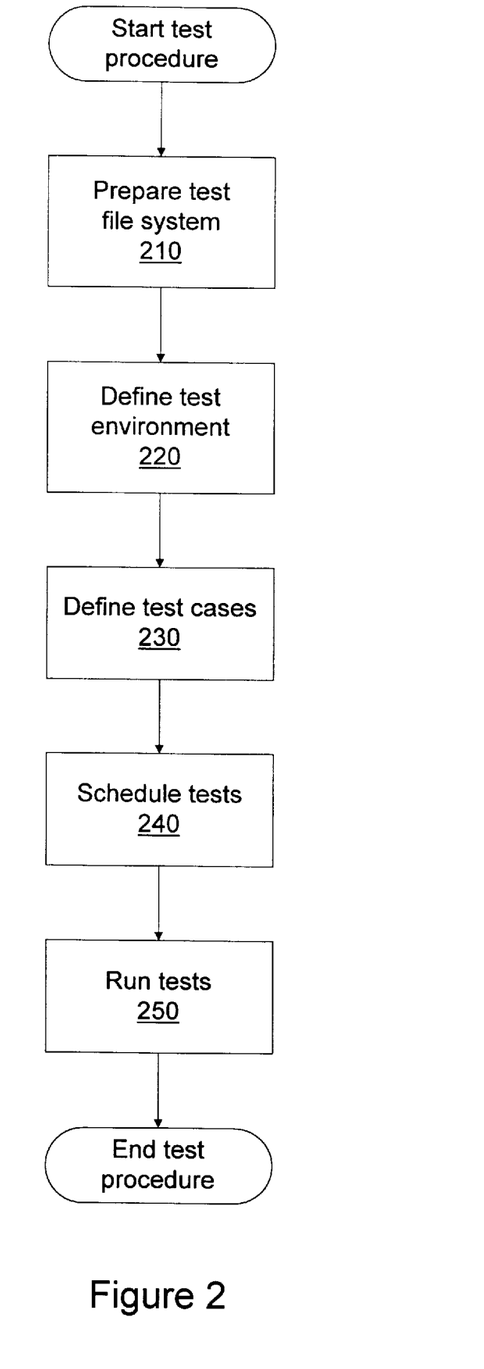
FIG. 2 shows a flow chart of a shared information protocol test harness module according to an embodiment of the invention.

FIG. 2 depicts a flow chart of an information sharing protocol test harness module according to an embodiment of the invention. The information sharing protocol test module may be executed on a computer system configured to execute the module and/or may be executed from a computer-readable storage medium. It is appreciated that the information sharing protocol test harness module and the other modules discussed herein may consist of directly entered commands by a computer system user or by steps executed by application specific hardware modules, but the preferred embodiment includes steps executed by software modules. The steps referred to herein may be modules or portions of modules. Furthermore, it is appreciated that the software modules discussed herein may include script, batch or other executable files. Furthermore, the software modules may include combinations and/or portions of such files.

The software modules may be stored on machine-readable or computer-readable storage media such as storage device 112 of computer system 110. Storage device 112 may be a magnetic floppy or hard disk or an optical disk such as CD-ROM, CD-R or DVD, for example. Storage device 112 may be a tape drive. Storage device 112 may also be a semiconductor-based memory module such as a FLASH memory, EEPROM, EPROM, ROM or RAM, and may be permanently, removably or remotely coupled to computer system 110. Thus, the software module may be stored within a computer system memory to configure the computer system to perform the functions of the module. Other new and various types of computer-readable storage media may be used to store the software modules discussed herein.

Referring to FIG. 2, at prepare test file system step 210, a test file system is prepared for the construction of a test suite and test harness. Specifically, a test file system is created and made available to one or several of application servers 130, 140 and 150. The test file system may be created by software program, downloading a file system from another file system, or direct user entry of commands, for example. In one embodiment, the test file system resides on file server 110 and is NFS mounted to the application servers to be tested. In another embodiment, the test file system is installed on each individual server involved in the file share protocol testing. The nature of the test case environment will dictate where the test file system should reside. In this embodiment, a test harness resides on file server 110 and will test the information sharing protocol of application servers 130, 140 and 150.

In one embodiment of prepare test file system step 210, the following directories are created within the file system: bin, tests, log, templates, and doc. The bin directory provides a location for applications and configuration files. For example, the env.config file is used to set up the various environment variables used for the test. The tests directory provides a location for the actual information sharing protocol test cases. The log directory provides an output location for the results of the test cases. For example, status information derived from the execution of the various test cases can be stored in files in the log directory. (Alternatively, status information may be intrinsic to the files that are manipulated during testing. For example, the information stored within the files has certain values if the tests were successful and other values if the tests were unsuccessful. Thus, the files contain intrinsic status information upon completion of a test.) The templates directory provides a location for copies of standard files such as different sized files upon which the various test cases will operate. The doc directory provides a location for test harness documentation.

The creation of file system directories is well known in the art. An example of the creation of one such directory includes the mkdir bin command (i.e., make a directory named "bin"). Also, various options may be determined when the directories are created. For example, options controlling access by various computer systems, computer system applications or computer system users may be set.

Control then transitions to define test environment step 220. During define test environment step 220, the configuration files are edited to define the actual test environment. For example, the env.config file located in the bin directory is edited to define the various environment variables used by the test harness. The variable testroot points to the root directory of the test environment directory tree where the test software should be installed. The testroot variable is used for referencing directories located within or below the directory indicated by testroot. For example, /$testroot/test1 references the directory labeled test1 under the directory pointed to by the variable testroot. The test case numbers to be executed in the next test run are provided by the variable testcases. The variable testcases is an array of test case numbers. The use of the testcases variable allows certain tests to be turned off during debug by removing them from the array. Once all of the test cases are debugged, all are included in the complete test suite.

Control then transitions to define test cases step 230. During define test cases step 230, a directory is created for the test harness and for each test case to be run by the test harness. In one embodiment, the test harness directory is labeled with the numeral 0, and the test case directories are labeled in sequential numerical order beginning with 1. The testcases variable contains the names (values) of these directories and is used to determine which cases are to be run and in which order the cases are to be run. Thus, in one embodiment, the variable testcases is an array of directory names in which a pointer moves from one name to the next to provide the name of the next test case. Other test case directory labeling techniques may also be used in accordance with the invention. For example, in another embodiment, when the first test case is called, the testcases variable provides a value identifying the first test case. When the next test case is called, the value of the testcases variable is incremented to identify the next test case.

In one embodiment of define test cases step 230, a test case is created by creating the numerically labeled test directory and installing three files into the directory: pre__test, runtest, and post__test. The pre__test script performs required setup for each test case within the test suite. For example, if a test case requires a certain file be present for that test case to run, the pre__test script creates the required file. The runtest file defines the actual test case. In the runtest file, a case statement defines what work the application server in the test environment should perform during the corresponding test case. The post_test script is run after each test case is complete and performs any cleanup or other actions required by the specific test case just completed.

Once the test harness is configured and the test suite populated as set forth above, control transitions to schedule tests step 240. During schedule tests step 240, the tests are scheduled by preparing a script in the bin directory named sched. The sched script is used to schedule a test run which typically includes a number of test cases within a test suite. The numerically labeled test directories each provide a test case in the test suite to be run by sched. The sched script directs the execution all of the files found in the test suite and uses the testcases variable to ensure that the test cases are executed in the proper order.

Control then transitions to run tests step 250. During run tests step 250, the tests are executed in succession by the sched script. To execute each test, the sched script executes the corresponding pre_test script, executes the test case, and executes the corresponding post_test script. When the scheduled test cases begin running, the application server in the test environment executes the tasks that it is configured to perform by the runtest script. The sched script executes responsive to an initiation input (from, e.g., a user or another computer system) to the computer system including the test harness (e.g., file server 110).

Data created by each test case script is output into a log file found in the log directory. Each test harness run creates a unique log directory so that no run will overwrite the data from a previous run, and creates a log file for each for each test run on each application server. For example, for a first test harness run on application server 130, a log file for test case one is referenced by log/1/130.1.log and a log file for test case two is referenced by log/1/130.2.log. For a second test harness run on application server 130, test case one is referenced by log/2/130.1.log. For a first test harness run on application server 140, test case one is referenced by log/1/140.1.log. In other embodiments, other file references may be used in accordance with the invention. Also, in other embodiments, data from test harness runs may be logged by other methods such as compiling an array of data for each run of the test harness.

During the run tests step 250 discussed above, a test case may be run on individual application server, on several application servers in succession, or on multiple application servers at the same time. If multiple computer systems are present in a particular application, testing is usually performed on each computer system individually. However, because client/server applications have become common in a variety of computer system applications, it is often useful to test multiple computer systems within a client/server test environment. Such a method of testing multiple computer systems is disclosed in co-pending U.S. patent application Ser. No. 08/866,728, attorney docket No. M-4631 US, filed on even date herewith, entitled "Multi-client Test Harness," naming Michael D. O'Donnell, Danny B. Gross and Gene R. Toomey as inventors, which is incorporated herein by reference in its entirety. Information sharing protocol testing or file lock testing may be performed either on individual systems or on multiple, networked systems in accordance with the present invention.

Figure 3:
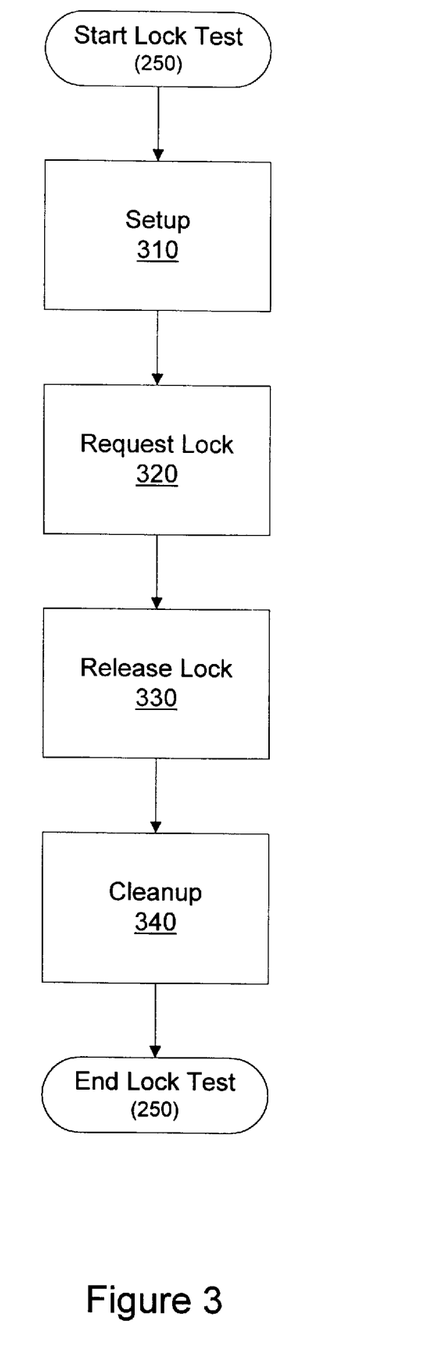
FIG. 3 shows a flow chart of a shared information protocol test case module according to an embodiment of the invention.

FIG. 3 depicts a flow chart of an file share protocol test case module according to an embodiment of the invention. (Although various modules described herein may be referred to as file share protocol test case modules, the modules may also include tests for portions of shared files.) At setup step 310, the sched script performs any necessary setup for the file share protocol test case to be executed. For example, a test file is created on file server 110. The test file is accessible by the application servers to be tested. If the test file is to be used in multiple test cases, its creation can be part of a global setup procedure. If the test file is to be used only in the next test case, the test file's creation should be part of the particular test cases' pre_test script. Control then transitions to request lock step 320. During request lock step 320, the sched script calls the runtest script which causes, e.g., application server 130 to request a lock on the test file created during setup step 310. In the present embodiment, file server 110 grants or denies the lock. Control then transitions to release lock step 330. During release lock step 330, the runtest script releases the lock on the test file if the lock was successful. If the lock was unsuccessful, the release lock step may be skipped. Any errors are recorded by one of the application servers according to standard error reporting techniques. Control then transitions to cleanup step 340. During cleanup step 340, the sched script calls the post_test script which deletes the test file created during setup step 310 to ensure that the tested application server is in the same condition at the end of the test as at the beginning of the test.

Figure 4A:
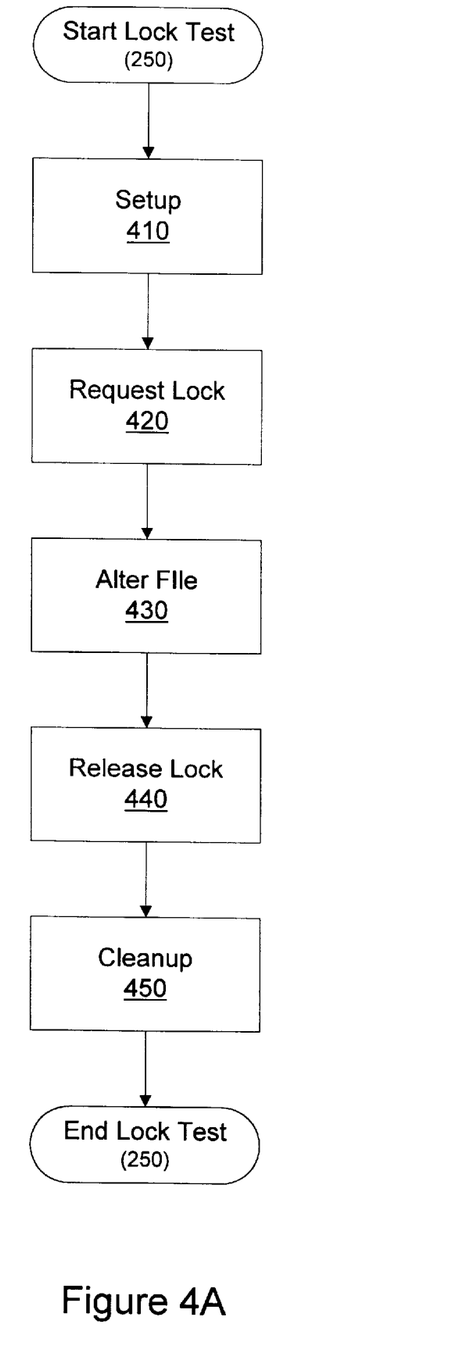
FIG. 4A shows a flow chart of a shared information protocol test module according to an embodiment of the invention.
Figure 4B:
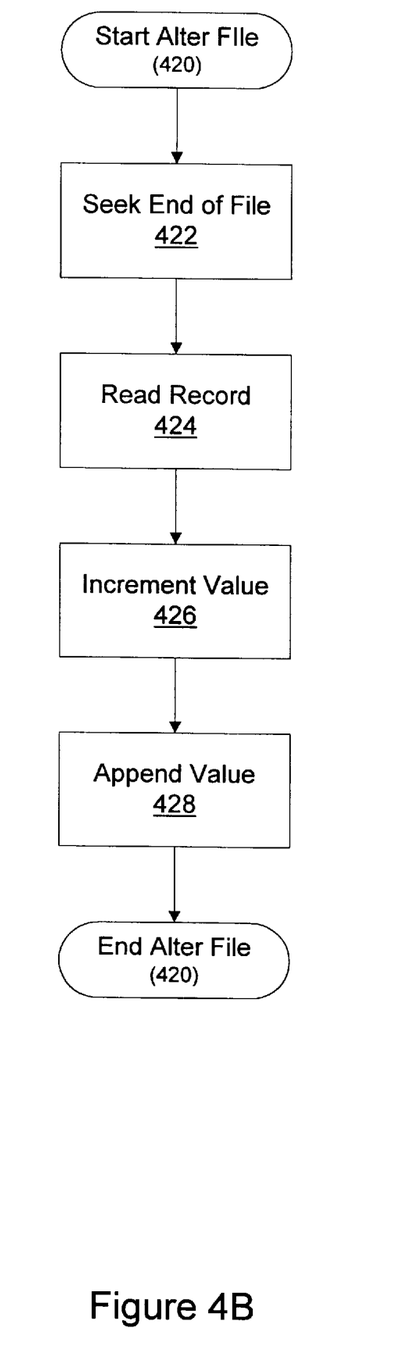
FIG. 4B shows a flow chart of a portion of a shared information protocol test module according to an embodiment of the invention.

FIG. 4A depicts a flow chart of a file share protocol test module for testing the locking of files or portions thereof according to an embodiment of the invention. At setup step 510, the sched script performs any necessary setup for the file share protocol test case to be executed. For example, a test file is created on file server 110. The test file is accessible by the application servers to be tested. If the test file is to be used in multiple test cases, its creation can be part of a global setup procedure. If the test file is to be used only in the next test case, the test file's creation should be part of the particular test cases' pre_test script. Control then transitions to request lock step 420. During request lock step 420, the sched script calls the runtest script which causes application server 130 to request a lock on the test file created during setup step 410. Control then transitions to alter file step 430. During alter file step 430, the file is altered by application server 130. The file is altered in a way that is easily detectable during a check to see if the file lock worked properly. An example of a file alteration is shown in FIG. 4B and discussed below. The file itself will contain intrinsic status information because, for example, the information stored in the file will indicate whether the file sharing protocol was functioning properly. Control then transitions to release lock step 440. During release lock step 440, the runtest script releases the lock on the test file. Control then transitions to cleanup step 450. During cleanup step 450, the sched script calls the post_test script which deletes the test file created during setup step 410 to ensure that the tested application server is in the same condition at the end of the test as at the beginning of the test.

FIG. 4B depicts a flow chart of an alter file portion of the file share protocol test module in which the shared information is altered by one of the applications capable of accessing the shared information. Control transitions from alter file step 420 to seek end of file stem 422. At seek end of file step 422, application server 130 seeks to the end of the file. For example, in one embodiment, the file consists of a plurality of records. Each record contains an integer. Application server 130 seeks to the last record in the file. Control then transitions to read record step 424. During read record step 424, application server 130 reads the value of the last record. Control then transitions to increment value step 426. During increment value step 426, application server 130 increments the value of the last record by one. Control then transitions to append value step 428. During append value step 428, application server alters the file by appending a record to the end of the file with the incremented value stored therein. In the embodiment of FIG. 4B, the numbers in the file will be in sequential order (increasing in magnitude by steps of one from the beginning to the end of the file) if the file sharing protocol is operating correctly. Thus, the file provides status information concerning the testing of the file sharing protocol.

Figure 5:
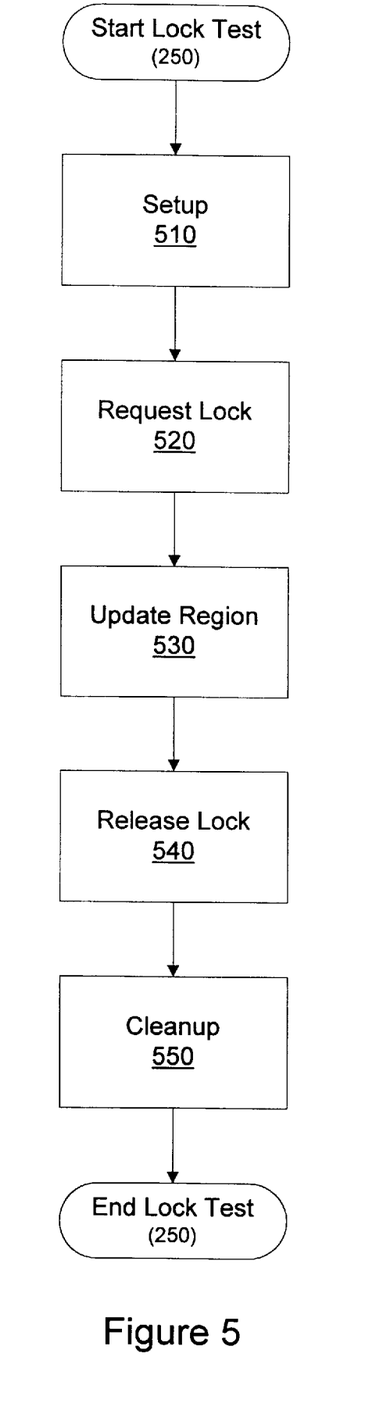
FIG. 5 shows a flow chart of a shared information protocol test module according to an embodiment of the invention.

The modules of FIGS. 3 and 4 show testing on a single computer system. Multiple computer systems may be tested according FIGS. 4 and/or 5 at different times or at the same time so that the computer systems alternate locking and altering files.

FIG. 5 depicts a flow chart of a file share protocol test module for testing the locking of files or portions thereof according to an embodiment of the invention. At setup step 510, the sched script performs any necessary setup for the file share protocol test case to be executed. For example, a test file is created on file server 110. The test file is accessible by the application servers to be tested. If the test file is to be used in multiple test cases, its creation can be part of a global setup procedure. If the test file is to be used only in the next test case, the test file's creation should be part of the particular test cases' pre_test script. The test file includes various regions which contain a semaphore that toggles between 0 and 1 every time that region is accessed.

Control then transitions to request lock step 520. During request lock step 520, the sched script calls the runtest script which causes application server 130 to request a lock on the test file created during setup step 510. Control then transitions to update region step 530. During update region step 530, a particular region of the test file is accessed causing the semaphore to toggle. Control then transitions to release lock step 540. During release lock step 540, the runtest script releases the lock on the test file. Control then transitions to cleanup step 550. During cleanup step 550, the sched script calls the post_test script which deletes the test file created during setup step 310 to ensure that the tested application server is in the same condition at the end of the test as at the beginning of the test.

In the file share protocol test module of FIG. 5, the values of the region semaphores are compared to the expected values of the semaphores. If the actual values match the predicted values, then the regions were updated correctly. For example, if the test file contains three regions with semaphores values equal to 0, and application servers 130, 140 and 150 access the regions in turn, then the values of the semaphores should all be equal to 1. Any other value indicates that the file locking did not work.

Figure 6:
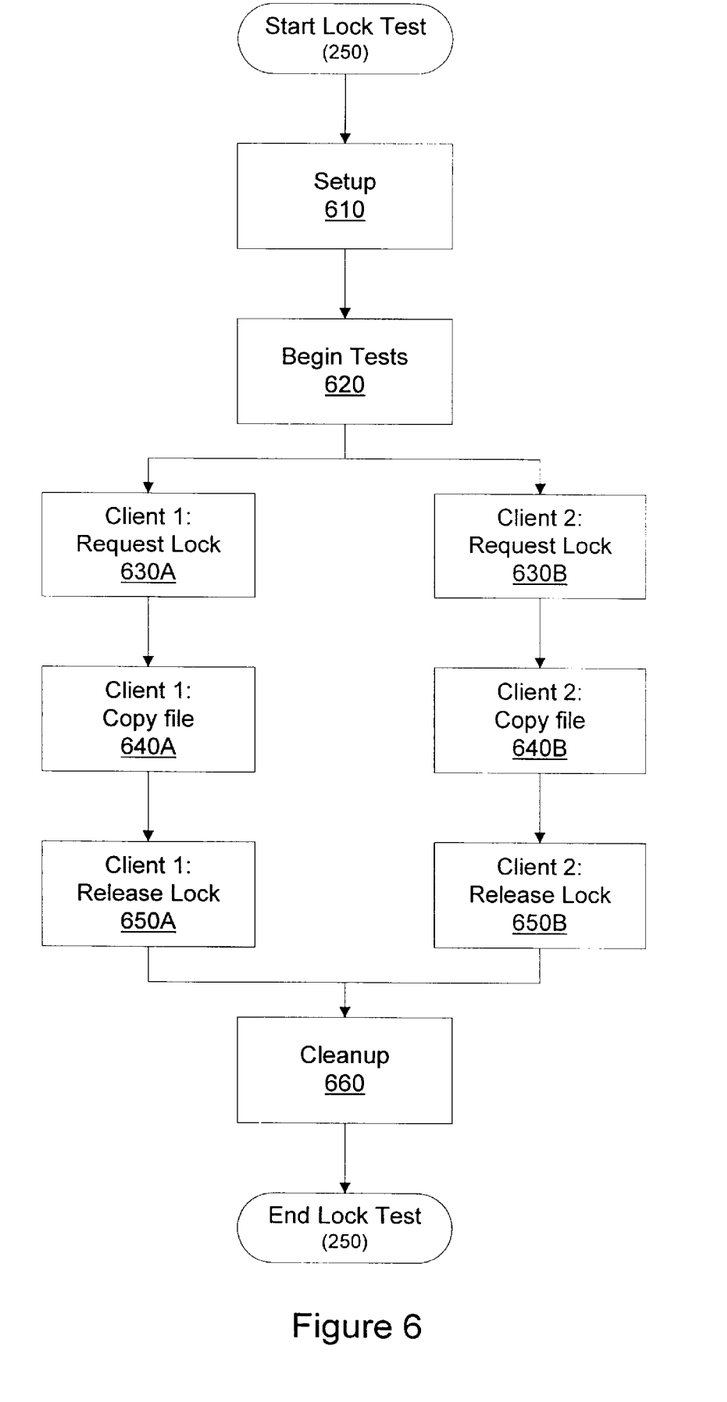
FIG. 6 shows a flow chart of a shared information protocol test module according to an embodiment of the invention.

FIG. 6 depicts a flow chart of a file share protocol test module for testing the locking of files or portions thereof according to an embodiment of the invention. At setup step 610, the sched script performs any necessary setup for the file share protocol test case to be executed. For example, a test file is created on file server 110 and first and second temporary files are created on application servers 130 and 140, respectively. The test file is accessible by application servers 130 and 140. If the test file is to be used in multiple test cases, its creation may be part of a global setup procedure. If the test file is to be used only in a particular test case, the test file's creation may be part of the particular test cases' pre_test script. Control then transitions to begin tests step 620. During begin tests step 620, each of applications servers 130 and 140 initiate execution of a test in which each application server accesses the test file on the file server.

Control then transitions to request lock steps 630A and 630B. During request lock step 630A, application server 130 requests a lock on the test file until a lock is granted to application server 130. During request lock step 630B, application server 140 requests a lock on the test file until a lock is granted to application server 140. If file locking is performing correctly, once a first application server is granted a lock, the other application server is denied a lock until the first application server releases the test file. Thus, if application server 130 is granted a lock on the test file, application server 140 remains in request lock step 630B until application server 130 releases the lock on the test file and a lock is granted to application server 140. If file locking is not performing correctly, each application server may be granted access to the test file without a lock. In this case, file corruption will occur in subsequent test steps.

Control then transitions to copy file steps 640A and 640B. During copy file step 640A, application server 130 copies data from the first temporary file on application server 130 to the test file on file server 110. During copy file step 640B, application server 140 copies data from the second temporary file on application server 140 to the test file on file server 110.

Control then transitions to release lock steps 650A and 650B. During release lock step 650A, application server 130 releases the lock on the test file that application server 130 was granted in request lock step 630A. During release lock step 650B, application server 140 releases the lock on the test file that application server 140 was granted in request lock step 630B. If, during request lock step 630A, application server 130 was granted a lock on the test file, when application server 130 releases the lock in release lock step 650A, application server 140 may be granted a lock on the test file. Thus, if the file sharing protocol functioned properly, application server 140 stalled in request lock step 630B while application server 130 transitioned through steps 630A–650A under control of the file share protocol test module. Steps 630A–650A and steps 630B–650B may be repeated through several iterations included within the file share protocol test module.

Control then transitions to cleanup step 660. During cleanup step 660, the sched script calls the post_test script which deletes the test file and temporary files created during setup step 610 to ensure that the servers that were controlled by the file share protocol test module are in the same condition at the end of the test as at the beginning of the test. The contents of the files are saved to preserve the status information intrinsic thereto. The contents of the files can show whether locks by different computer processes were active at the same time. For example, the information in the files will be different from expected or otherwise corrupt. Clean up step 610 is optional. For example, if the test file and temporary files will be used in a subsequent test, clean up step 610 may be skipped.

In other embodiments of the invention, actual code from a production or design environment may be tested by executing portions of the actual code that perform file locking or otherwise execute a file share protocol. Furthermore, I/O tests may be run to test the effect of I/O volume on file locking. For example, application server 150 may be tested by performing a file share protocol test while increasing the I/O load on application server 150 by copying large numbers of files, large files or small files. If application server 150 is operating to standards, application server will not experience a performance degradation due to high input/output volume.

While the invention has been described with reference to various embodiments, it will be understood that these embodiments are illustrative and that the scope of the invention is not limited to them. Many variations, modifications, additions, and improvements of the embodiments described are possible. For example, although the test harness has been described in the context of an HP-UX based operating system, other suitable operating systems include, e.g., the IBM AIX operating system and non-UNIX type operating systems where file sharing protocols may be implemented. Also, those skilled in the art will recognize that the file share protocol tests described herein are merely illustrative and a variety of additional and/or alternative test techniques may be analogously provided in accordance with the present invention.

The above test modules may be included in a script, batch or executable file which can be stored on a machine-readable or computer-readable storage medium such as disk drive or CD-ROM 112. Furthermore, a computer system may be configured to execute the above test modules on another computer system. This embodiment is useful in a distributed computing environment.

Additionally, those skilled in the art will recognize that although the functions of the above referenced modules are performed by software modules in the present embodiment, other types of modules may be used such as application specific hardware modules and configured hardware modules. Also, the boundaries between modules are merely illustrative and alternative embodiments may merge modules or impose an alternate decomposition of functionality of modules. For example, a software module for testing the file share protocol of the application servers may incorporate several tests in one module. The merged test module could be initiated with different parameters to perform setups for the particular tests to be executed. Alternatively, modules for testing the file share protocol of a computer system may be decomposed into modules to perform the separate steps of the original module. For example, the file share protocol test module of FIG. 3 could be decomposed into a setup module, a request and release module, and a cleanup module. Moreover, alternative embodiments may combine multiple instances of a particular component, and the steps given in the exemplary embodiment are for illustration only. Steps may be combined or the functionality of the steps may be distributed in additional steps in accordance with the invention.

These and other variations, modifications, additions, and improvements may fall within the scope of the invention as defined in the claims which follow.

What is claimed is:

1. A method of testing the sharing of stored information by a plurality of computer system applications, the method comprising:
   requesting a first lock on a block of stored information by a first test application so that the first test application can access the block of stored information without the block of stored information being changed by a second test application;
   releasing the first lock on the block of stored information by the first test application if the first lock on the block of stored information is granted;
   requesting a second lock on the block of stored information by the first test application after releasing the first lock;
   releasing the second lock on the block of stored information by the first test application after requesting the second lock; and
   generating status information, the status information including information regarding the requesting of the first lock and the releasing of the first lock and regarding the requesting of the second lock and the releasing of the second lock on the block of stored information.

2. The method of claim 1 further comprising:
   requesting a third lock on the block of stored information by the second test application;
   releasing the third lock on the block of stored information by the second test application after requesting the third lock;
   requesting a fourth lock on the file by the second test application after requesting the third lock; and
   releasing the fourth lock on the file by the second test application after requesting the fourth lock;
   wherein the status information further includes information regarding the requesting of the third and fourth locks and the releasing of the third and fourth locks on the block of stored information.

3. The method of claim 2 wherein the status information indicates whether one of the first and second locks are active at the same time as one of the third and fourth locks.

4. The method of claim 2 wherein the first test application initiates operation on a first computer system and the second test application initiates operation on a second computer system.

5. The method of claim 4 wherein the block of stored information is stored on a storage device coupled to a third computer system.

6. The method of claim 4 further comprising determining the effect of the requesting and the releasing by the first and second test applications on the first and second computer systems after releasing the fourth lock on the file by the second test application, wherein the status information includes information regarding the effect of the requesting and the releasing by the first and second test applications on the first and second computer systems.

7. The method of claim 4, wherein
   the block of stored information is stored on at least one of a plurality of computer systems, the plurality of computer systems including the first and second computer systems; and
   the method includes substantially increasing the I/O load of the at least one computer system, the status information indicating the effect on the requesting and releasing of the first, second third and fourth locks on the block of stored information due to the increased I/O load.

8. The method of claim 4, wherein
   the first computer system is of a first hardware type; and
   the second computer system is of a second hardware type.

9. A method of testing the sharing of stored information by a plurality of computer system applications, the method comprising:
   requesting a first lock on a block of stored information by a first test application so that the first test application can access the block of stored information without the block of stored information being changed by a second test application;
   releasing the first lock on the block of stored information by the first test application if the first lock on the block of stored information is granted;
   generating status information, the status information including information regarding the requesting of the first lock and the releasing of the first lock on the block of stored information; and
   determining if the first test application obtained the first lock on the block of stored information, the status information indicating whether the first test application obtained the first lock on the block of stored information.

10. The method of claim 9 further comprising:

requesting a second lock on the block of stored information by the first test application after releasing the first lock;

releasing the second lock on the block of stored information by the first test application after requesting the second lock and before generating the status information; and determining if the first test application obtained the second lock on the block of stored information;

wherein the status information further includes information regarding the requesting of the second lock and the releasing of the second lock, and the status information indicates whether the second test application obtained the second lock on the block of stored information.

11. The method of claim 10 further comprising:

requesting a third lock on the block of stored information by the second test application;

releasing the third lock on the block of stored information by the second test application after requesting the third lock;

requesting a fourth lock on the file by the second test application after requesting the third lock; and releasing the fourth lock on the file by the second test application after requesting the fourth lock;

wherein the status information further includes information regarding the requesting of the third and fourth locks and the releasing of the third and fourth locks on the block of stored information.

12. The method of claim 11 wherein the status information indicates whether one of the first and second locks are active at the same time as one of the third and fourth locks.

13. The method of claim 11 wherein the first test application initiates operation on a first computer system and the second test application initiates operation on a second computer system.

14. The method of claim 13 wherein the block of stored information is stored on a storage device coupled to a third computer system.

15. The method of claim 13 further comprising determining the effect of the requesting and the releasing by the first and second test applications on the first and second computer systems after releasing the fourth lock on the file by the second test application, wherein the status information includes information regarding the effect of the requesting and the releasing by the first and second test applications on the first and second computer systems.

16. The method of claim 13, wherein the block of stored information is stored on at least one of a plurality of computer systems, the plurality of computer systems including the first and second computer systems; and the method includes substantially increasing the I/O load of the at least one computer system, the status information indicating the effect on the requesting and releasing of the first, second third and fourth locks on the block of stored information due to the increased I/O load.

17. The method of claim 13, wherein the first computer system is of a first hardware type; and
the second computer system is of a second hardware type.

18. A method of testing the sharing of stored information by a plurality of computer system applications, the method comprising:

requesting a first lock on a block of stored information by a first test application so that the first test application can access the block of stored information without the block of stored information being changed by a second test application;

changing the block of stored information by the first test application after requesting the first lock on the block of stored information by the first test applications;

releasing the first lock on the block of stored information by the first test application if the first lock on the block of stored information is granted; and generating status information, the status information including information regarding the requesting of the first lock and the releasing of the first lock on the block of stored information.

19. The method of claim 18 further comprising:

requesting a second lock on the block of stored information by the second test application after requesting the first lock on the block of stored information by the first test application and before releasing the first lock on the block of stored information by the first test application changing the block of stored information by the second test application after requesting the second lock on the block of stored information.

20. The method of claim 19 wherein the changing the block of stored information by the first and second test applications comprises incrementing a value stored in the block of stored information.

21. The method of claim 19 wherein the changing the block of stored information by the first and second test applications comprises changing a semaphore stored in the block of stored information.

22. A method of testing the sharing of stored information by a plurality of computer system applications, the method comprising:

requesting a first lock on a block of stored information by a first test application so that the first test application can access the block of stored information without the block of stored information being changed by a second test application;

releasing the first lock on the block of stored information by the first test application if the first lock on the block of stored information is granted;

generating status information, the status information including information regarding the requesting of the first lock and the releasing of the first lock on the block of stored information;

wherein the requesting and the releasing are performed by a production software module, the software module including at least a portion of actual production environment software.

23. An apparatus for testing the sharing of stored information, the apparatus comprising:

a computer-readable storage medium; and an information sharing protocol test harness module stored on the computer-readable storage medium, the information sharing protocol test harness module executing at least one information sharing protocol test case on at least one computer system responsive to a test initiation input, the information sharing protocol test case for testing the locking of storage locations to prevent data corruption;

wherein the information sharing protocol test harness module comprises a lock test module stored on the computer-readable storage medium, the lock test module for testing a remote procedure call lock daemon, the lock test module comprising:

a lock initiation module for initiating a remote procedure call lock upon a block of stored information responsive to a test initiation event;

a lock release module for releasing the lock upon the block of stored information after the lock initiation module initiates the remote procedure call lock; and a monitor module for monitoring the status of the remote procedure call lock daemon for errors.

24. The apparatus of claim 23, wherein the information sharing protocol test harness module further comprises a schedule module for executing the modules within the lock test module in a determined order to perform a determined lock test on a computer system responsive to a test initiation event.

25. The apparatus of claim 24, wherein the lock test module further comprises an information modification module for modifying the block of stored information after the lock initiation module initiates the remote procedure call lock upon the block of stored information and before the lock release module releases the lock upon the block of stored information, the monitor module monitoring the block of stored information for data corruption responsive to the information modification module modifying the block of stored information.

26. The apparatus of claim 24, wherein the lock test module further comprises an information copy module for copying to and from a memory location of the block of stored information after the lock initiation module initiates the remote procedure call lock upon the block of stored information and before the lock release module releases the lock upon the block of stored information.

27. The apparatus of claim 24, wherein the lock test module further comprises a test setup module for preparing the computer system for lock testing by creating the block of stored information in a storage device of the computer system before the schedule module executes the modules within the lock test module.

28. The apparatus of claim 24, wherein the lock test module further comprises a test cleanup module for returning the computer system to a pretest state responsive to completion of all lock tests scheduled by the schedule module.

29. The apparatus of claim 24, wherein the schedule module comprises a synchronization module for executing the lock test module on each of a plurality of computer systems at substantially the same time.

30. An apparatus for testing the sharing of stored information, the apparatus comprising:

a computer-readable storage medium; and an information sharing protocol test harness module stored on the computer-readable storage medium, the information sharing protocol test harness module executing at least one information sharing protocol test case on at least one computer system responsive to a test initiation input, the information sharing protocol test case for testing the locking of storage locations to prevent data corruption;

wherein the information sharing protocol test harness module comprises means for testing a remote procedure call lock daemon on a computer system operating under control of a UNIX type operating system.

31. The apparatus of claim 30, wherein the information sharing protocol test harness module further comprises a lock test module stored on the computer-readable storage medium, the lock test module for testing a remote procedure call lock daemon, the lock test module comprising:

a lock initiation module for initiating a remote procedure call lock upon a block of stored information responsive to a test initiation event;

a lock release module for releasing the lock upon the block of stored information after the lock initiation module initiates the remote procedure call lock; and a monitor module for monitoring the status of the remote procedure call lock daemon for errors.

32. The apparatus of claim 31, wherein the information sharing protocol test harness module further comprises a schedule module for executing the modules within the lock test module in a determined order to perform a determined lock test on a computer system responsive to a test initiation event.

33. The apparatus of claim 32, wherein the lock test module further comprises an information modification module for modifying the block of stored information after the lock initiation module initiates the remote procedure call lock upon the block of stored information and before the lock release module releases the lock upon the block of stored information, the monitor module monitoring the block of stored information for data corruption responsive to the information modification module modifying the block of stored information.

34. The apparatus of claim 32, wherein the lock test module further comprises an information copy module for copying to and from a memory location of the block of stored information after the lock initiation module initiates the remote procedure call lock upon the block of stored information and before the lock release module releases the lock upon the block of stored information.

35. The apparatus of claim 32, wherein the lock test module further comprises a test setup module for preparing the computer system for lock testing by creating the block of stored information in a storage device of the computer system before the schedule module executes the modules within the lock test module.

36. The apparatus of claim 32, wherein the lock test module further comprises a test cleanup module for returning the computer system to a pre-test state responsive to completion of all lock tests scheduled by the schedule module.

37. The apparatus of claim 32, wherein the schedule module comprises a synchronization module for executing the lock test module on each of a plurality of computer systems at substantially the same time.

* * * * *